United States Patent
Koets

(10) Patent No.: US 7,130,243 B2
(45) Date of Patent: Oct. 31, 2006

(54) LOCATION FINDING SYSTEM, USING REFLECTED RADIO FREQUENCY OR ACOUSTIC SIGNALS IN A CROWDED REFLECTOR ENVIRONMENT

(75) Inventor: Michael A. Koets, Atascosa, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/331,711

(22) Filed: Jan. 13, 2006

(65) Prior Publication Data

US 2006/0198244 A1 Sep. 7, 2006

Related U.S. Application Data

(60) Provisional application No. 60/643,977, filed on Jan. 14, 2005.

(51) Int. Cl.
*G01S 5/04* (2006.01)

(52) U.S. Cl. .................. 367/87; 367/117; 342/444; 342/465

(58) Field of Classification Search .............. 367/37, 367/87, 117; 342/450, 465, 444
See application file for complete search history.

(56) References Cited

U.S. PATENT DOCUMENTS 6,822,604 B1 * 11/2004 Hall et al. .............. 342/28
6,882,315 B1 * 4/2005 Richley et al. .......... 342/465

* cited by examiner

*Primary Examiner*—Mark Hellner
(74) *Attorney, Agent, or Firm*—Baker Botts L.L.P.

(57) ABSTRACT

A method of locating one or more reflectors in an environment crowded with reflectors. A transmitter and multiple receivers are used to obtain reflected signals. Each path of a reflected signal is defined by an ellipse having the transmitter at one focus and a receiver at the other. A reflector is assumed to lie on the ellipse, and an intersection of ellipses is assumed to be a reflector location. The region is iteratively divided into smaller and smaller cells, and a search algorithm is performed to determine whether a given point in each cell lies on an ellipse. A "solution" is a point that lies on the same number of ellipses as the number of receivers.

9 Claims, 2 Drawing Sheets

LOCATION FINDING SYSTEM, USING REFLECTED RADIO FREQUENCY OR ACOUSTIC SIGNALS IN A CROWDED REFLECTOR ENVIRONMENT

CROSS-REFERENCE TO RELATED APPLICATIONS

This application claims the benefit of U.S. Provisional Application Ser. No. 60/643,977 filed Jan. 14, 2005, which is incorporated herein by reference in its entirety.

TECHNICAL FIELD OF THE INVENTION

This invention relates to location finding systems, using reflected radio frequency or acoustic signals, and in particular, to such systems when there are multiple reflectors in a closed environment.

BACKGROUND OF THE INVENTION

Reflected radio frequency (RF) or acoustic waves may be used to determine the location of an object that reflects such waves, i.e., a "reflector". Various algorithms have been developed, for use when there are one or more reflectors and for use in two-dimensional as well as three-dimensional space. One approach uses the travel time of the reflected signal to compute the length of the path of the signal from transmitter to the reflector(s) to receiver. Once the path lengths are known, mathematical and geometric techniques are used to locate the object.

Traditional algorithms are easy and straightforward when there is a single reflector. However, in a space crowded with reflectors, such as an indoor space, traditional algorithms are less satisfactory.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to algorithms for determining the position of an object that reflects RF or acoustic waves (a "reflector"). The algorithms process measurements of the length of the path from a transmitter to the reflector to a receiver. An exemplary application is bistatic radar with a relatively unique waveform (ultra wideband).

As explained below, the method uses a quadtree search strategy and a set of ellipsoidal basis functions. Rectilinear coordinates are transformed to a new coordinate space consisting of ellipsoids of equidistant origin based on transmitter and receiver pairs. Points in the rectilinear space are tested using consistency metrics in the ellipsoidal space, given multiple signal arrival times. A scoring function determines the fit of a rectilinear location to a reflector criterion in the ellipsoidal space. Rectilinear cells are divided and tested so that the search for reflector locations is of reduced computational complexity.

The algorithms apply to scenarios where there is one transmitter capable of generating pulses of energy that reflect from the structures of interest, one or more discrete reflectors, and either a set of receivers or a movable receiver capable of capturing reflected energy pulses. It is assumed that the time of transmission of a pulse and the propagation velocity of the pulse are known. The arrival time of each reflected pulse at the receiver(s) is recorded. This is used to determine the "travel time", that is, the time it took the pulse to travel from the transmitter to the reflector to the receiver. The travel time is multiplied by the propagation velocity to determine the length of the path.

These path lengths are then processed by the algorithm described herein to determine the location of the reflector. If a sufficiently large number of receivers are employed simultaneously, then the mapping of the reflectors can be completed with a single transmitted pulse. If only one receiver is available, then mapping can be accomplished using multiple transmitted pulses. The receiver is moved to a new location after each pulse, thereby synthesizing a larger array of receivers.

The algorithm can be employed in two or three dimensions. Generally, three receivers (or three transmissions when there is only a single receiver) are required for single-pulse mapping in two dimensions and four receivers are required in three dimensions. Additional receivers can improve performance.

As indicated in the Background, for some applications, the reflector of interest may be in an environment crowded with other reflectors. For example, a tracking system might be used to track a reflector in indoor environment. As explained below, the existence of multiple reflectors complicates the use of conventional reflector mapping (location finding) methods.

Figure 1:
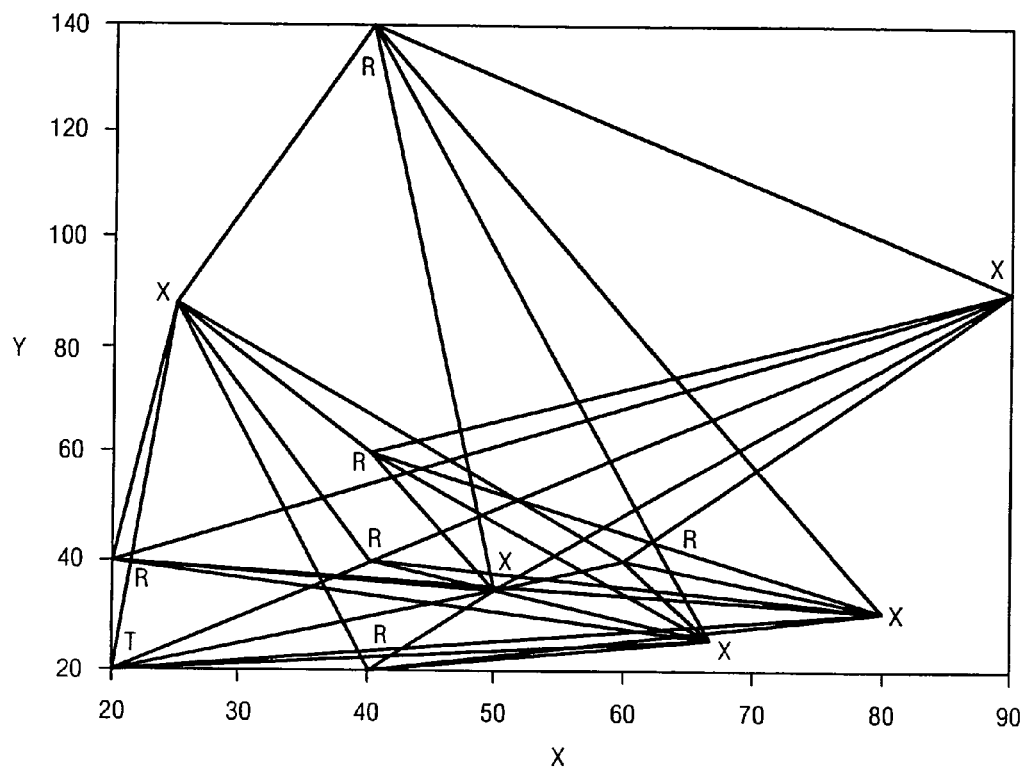
FIG. 1 illustrates a typical two-dimensional location finding scenario.

FIG. 1 illustrates a typical two-dimensional location finding scenario, with multiple reflectors. The transmitter is illustrated as R, six receivers are illustrated as R's, and five reflectors are illustrated as X's. The lines show the paths of the pulses from the transmitter to the reflectors to the receivers.

Two Dimensional Mapping Algorithm

Figure 2:
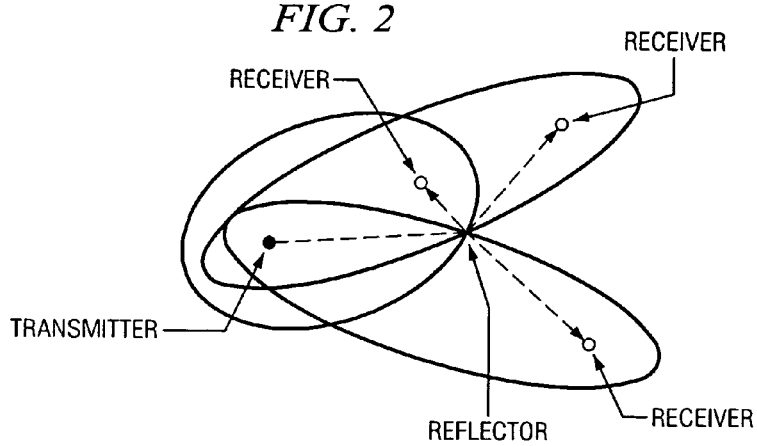
FIG. 2 illustrates elliptical mapping in two dimensions with a single reflector.

FIG. 2 illustrates an elliptical mapping algorithm in two dimensions, with a single reflector. Each measured path from transmitter to reflector to receiver defines an ellipse with the transmitter at one focus and the receiver at the other. The reflector lies on the ellipse. When multiple measurements are made, multiple ellipses with different sizes, eccentricities, and orientations are defined. The reflector can be precisely located at the intersection of all of the elliptical contours.

In the scenario of FIG. 2, there is a single reflector and it is relatively simple to analytically determine the coordinates common to all three ellipses. But in cases where there are multiple reflectors, such as the scenario of FIG. 1, the process is complicated by the fact that it may not be possible to associate received pulses with particular reflectors.

When there are multiple reflectors, for each reflector, we must find the point that satisfies a set of elliptical equations, with the number of equations determined by the number of receivers. Each measured path distance determines one of the elliptical equations, so the total number of equations is equal to the number of receivers times the number of reflectors. The complication arises because we don't know which subset of the set of elliptical equations must be solved to find the location of a particular reflector.

The algorithm described herein does not seek to derive the location of solutions from the set of elliptical equations. Rather, we develop a formulation which allows to determine if a particular specified point is consistent with a solution or not.

In a simple approach to mapping, the region under consideration is divided into a fine array of cells. An evaluation is performed to determine whether each cell is consistent with a solution. The output map would then be the set of those cells that were consistent. A more precise and computationally efficient approach is described later in this document, but first we will derive a method of evaluating the consistency of a cell.

Define $\bar{t}$ to be the position of the transmitter in the global coordinate system of the scenario. Define $\bar{r}_i$ to be the position of the $i^{th}$ receiver in the global coordinate system.

The cell under consideration is represented by a point in the cell. In order to simplify the computations, we translate the coordinates of the point into a local coordinate system defined by the ellipse we are currently working with. In this local coordinate system, the transmitter and receiver lie on the x axis with the origin equidistant between them. We define $c_i = \frac{1}{2}|\bar{r}_i - \bar{t}|$, one half the distance between the transmitter and the $i^{th}$ receiver, and define $\bar{t}_i = (-c_i, 0)$ and $\bar{r}_i = (c_i, 0)$ to be the coordinates of the transmitter and receiver, respectively, in the local coordinate system.

In order to translate the coordinates of the point from the global coordinate system to the local coordinate system, we compute the origin of the local coordinate system and orthonormal basis vectors for the coordinate system as:

$$\bar{o}_i = \frac{\bar{r}_i + \bar{t}}{2}$$

$$\bar{d}_i^{(1)} = \frac{\bar{r}_i - \bar{t}}{|\bar{r}_i - \bar{t}|}$$

$$\bar{d}_i^{(2)} = \begin{bmatrix} 0 & -1 \\ 1 & 0 \end{bmatrix} \cdot \bar{d}_i^{(1)}$$

$$D_i = \begin{bmatrix} \bar{d}_i^{(1)} & \bar{d}_i^{(2)} \end{bmatrix}$$

To translate the point being tested from the global coordinate system, $\bar{p}$, to the $i^{th}$ local coordinate system, we compute:

$$\bar{p}'_i D_i^T (\bar{p} - \bar{o}_i)$$

Next, we narrow our focus to a particular elliptical contour associated with receiver i. We compute $b_{ij}^2 = a_{ij}^2 - c_i^2$, where $a_{ij}$ is the measured path distance for a particular pulse. The value of c is constant for each reflector. The indices i and j represent the ith receiver and jth reflected signal. The preceding equation is a well known mathematical representation of an ellipse, with b representing half the length of the minor axis.

We then compute the fit of the point under test to this contour:

$$\alpha = \left| (\bar{p}'_i)^T \begin{bmatrix} \frac{1}{a_{ij}^2} & 0 \\ 0 & \frac{1}{b_{ij}^2} \end{bmatrix} (\bar{p}'_i) - 1 \right|$$

This is a representation of the ellipse equation. If the point under test lies on the ellipse, then the value of $\alpha$ will be zero. If the point lies near the ellipse, then the value of $\alpha$ will be small.

We make a decision about whether the point is consistent with the contour by comparing it with a threshold, $\eta$, which is defined below. If $\alpha$ is less than $\eta$, then the point is assumed to be consistent with the contour. If the point is consistent with a number of contours equal to the number of receivers, then that point is assumed to be a reflector.

We choose $\eta$ based on the concept that the point under test represents the center of a square cell with edges of length g. We wish the fit, $\alpha$, to be less than $\eta$ whenever the contour passes through that square cell.

The fit can be defined as:

$$\alpha = \left| \frac{x'^2}{a_{ij}^2} + \frac{y'^2}{b_{ij}^2} - 1 \right|,$$

where x' and y' are the coordinates of the cell center in the local coordinate system of the ellipse. If the center of the cell lies on the ellipse, then $\alpha=0$. In general $\alpha \neq 0$, but $$\left| \frac{(x' + \delta_x)^2}{a_{ij}^2} + \frac{(y' + \delta_y)^2}{b_{ij}^2} - 1 \right| = 0$$

for any $\delta_x$ and $\delta_y$ which correct the cell center to lie on the contour. Using this we can compute:

$$\alpha = \left| \frac{x'^2}{a_{ij}^2} + \frac{y'^2}{b_{ij}^2} - 1 \right| = \left| \frac{2x'\delta_x}{a_{ij}^2} + \frac{\delta_x^2}{a_{ij}^2} + \frac{2y'\delta_y}{b_{ij}^2} + \frac{\delta_y^2}{b_{ij}^2} \right|$$

We use this result to define a score function for the pixel as:

$$s(\Delta_x, \Delta_y) = \left| \frac{2x'\Delta_x}{a_{ij}^2} + \frac{\Delta_x^2}{a_{ij}^2} + \frac{2y'\Delta_y}{b_{ij}^2} + \frac{\Delta_y^2}{b_{ij}^2} \right|$$

Now we wish to find the maximum of s over the cell because, if the contour passes through the cell, then there exists $\delta_x$ and $\delta_y$ such that the point $(x'+\delta_x, y'+\delta_y)$ is in the cell and $s(\delta_x, \delta_y) = \alpha$. Therefore $\max(s) \geq s(\delta_x, \delta_y) = \alpha$, and we achieve our desired test by setting $\eta = \max(s)$.

This approach is guaranteed to never reject a cell that does contain a contour. However, it may falsely identify a contour in a cell, because there is no guarantee that $\alpha > \max(s)$ when no contour passes through the cell.

In order to find max(s) over the cell, it is tempting to find the maximum value of the function for $$|\Delta_x| < \frac{g}{2}, |\Delta_y| < \frac{g}{2}.$$

However, due to the rotation induced by the translation from the global coordinate system (where the cell is defined) to the local coordinate system (where the search takes place) the region evaluated by this procedure will not be the same as the original cell and the maximum value found may not be the maximum value of the original cell.

We could consider searching for the maximum value of s over a circular region with radius $$\frac{g}{\sqrt{2}},$$

which is guaranteed to contain the original cell regardless of rotation. However, the maximization of the function over this region has not proven tractable.

Figure 3:
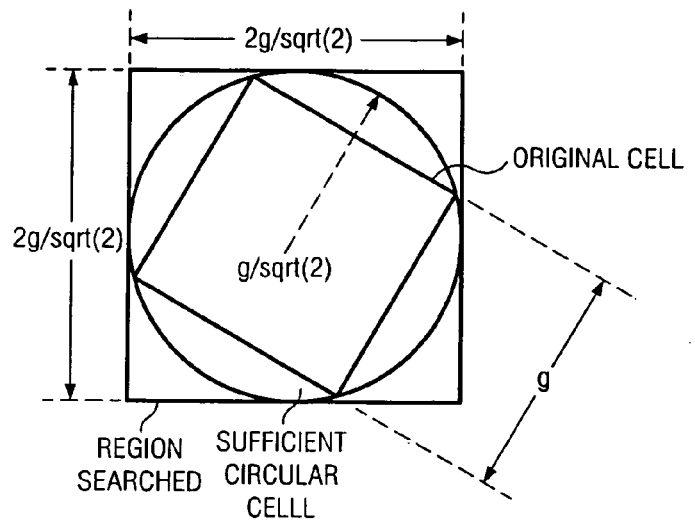
FIG. 3 illustrates the search region associated with a cell.

FIG. 3 illustrates the region that is the subject of the search in accordance with the invention. This region is defined as:

$$|\Delta_x| < \frac{g}{\sqrt{2}}, \quad |\Delta_y| < \frac{g}{\sqrt{2}},$$

which is the square region aligned with the local coordinate axes that contains the circular region which itself contains the original cell.

It can be seen that the maximum over this cell occurs at $$\Delta_x = \text{sign}(x) \cdot \frac{g}{\sqrt{2}},$$

$$\Delta_y = \text{sign}(y) \cdot \frac{g}{\sqrt{2}},$$

and has value:

$$\max(s(\Delta_x, \Delta_y)) = \left| \frac{2|x'|g}{\sqrt{2}\, a_{ij}^2} + \frac{g^2}{a_{ij}^2} + \frac{2|y'|g}{\sqrt{2}\, b_{ij}^2} + \frac{g^2}{b_{ij}^2} \right| = \eta$$

Figure 4:
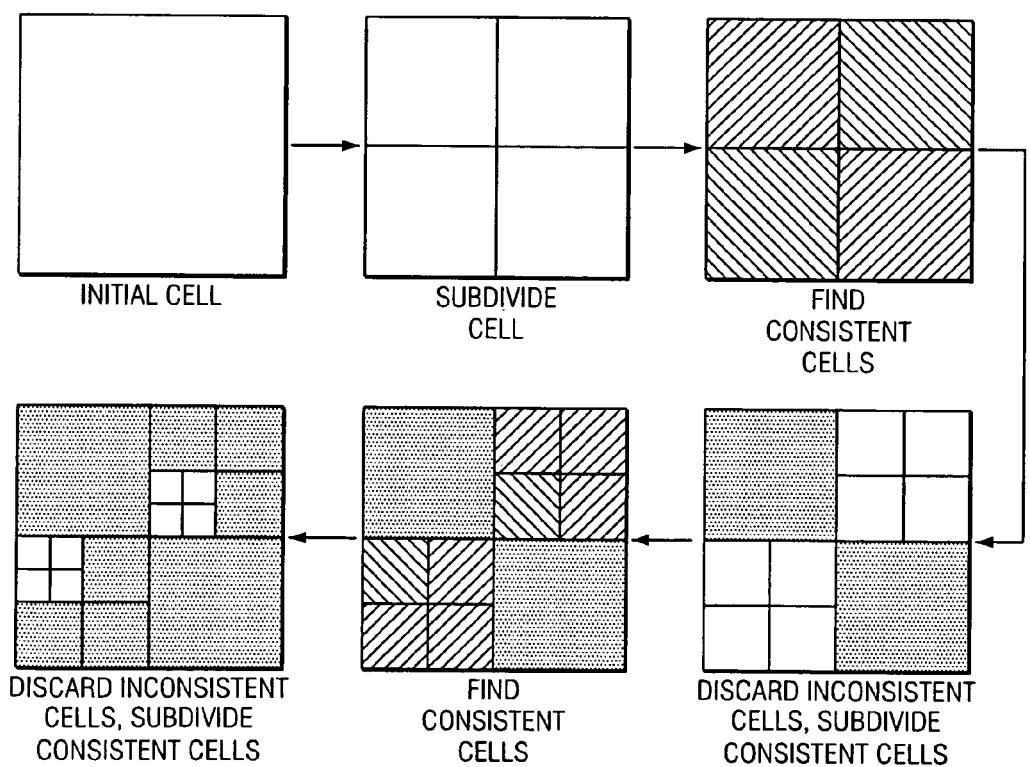
FIG. 4 illustrates the first few iterations of the search algorithm.

FIG. 4 illustrates the first few iterations of the search algorithm. The algorithm uses a quadtree to search for ever smaller cells that are consistent with a reflector location. The first cell tested is a square cell that encompasses the entire region of interest. If it is not consistent with a solution, then processing is terminated. If it is consistent with a solution, then the cell is subdivided into four smaller cells, and each of those evaluated. Any cell that is inconsistent with a solution is discarded. Any cell that is consistent with a solution is further subdivided. The process continues recursively until the cells reach a specified size. The size of the cells determines the mapping resolution, that is, the smaller the cells, the more precisely the location can be determined.

In other embodiments, the division of cells could be into partitions other than four. Also, the cells need not be square. However, the above method with four (quad) divisions and square cells is intended to simplify mathematical calculations.

Summary of Steps of the Algorithm

From the above, it can be seen that the number of reflectors and their location in an area of interest can be calculated. This method of locating reflectors in an area of interest can be summarized as follows:

1. For each receiver, receive a number of reflected signals. For purposes of this description and the claims, a set of receivers is deemed equivalent to a single receiver that is moved to different locations.

2. Calculate the path distance, $a_{ij}$, of each reflected signal, for each ith receiver and each jth reflected signal 3. Define an ellipse associated with each reflected signal, with the transmitter and receiver of that signal as the two foci, as:

$$b^2 = a^2 - c^2$$

where a is the path distance, c is half the distance between the foci, and b (half the minor axis) is calculated.

4. Represent the region of interest as a first rectangular cell, with point p as the mid point of the cell.

5. Calculate the fit of p to the ellipse equation.

6. Continue testing the cell for each receiver and each reflected signal associated with that receiver.

7. If a cell has a point that fits a sufficient number (set) of ellipses, it is considered to contain a reflector. Ideally, the point should fit the same number of ellipses as reflectors. If the cell contains more than one reflector, more than one point may fit a set of ellipses.

8. If the cell does not contain at least one reflector, it is discarded.

9. A cell containing at least one reflector is consistent with a solution.

10. Repeat Steps 5–7 for each cell. There is only one cell for the first iteration.

11. For any cell that is consistent with a solution, divide that cell and repeat Steps 5–7.

Three Dimensional Mapping Algorithm

The three dimensional reflector location algorithm parallels the two dimensional algorithm very closely. In three dimensions, a measured path distance defines an ellipsoid of revolution with the transmitter and receiver at the foci. This contour is not an unconstrained ellipsoid, but obeys the equation:

$$\frac{x^2}{a^2} + \frac{y^2}{b^2} + \frac{z^2}{b^2} = 1,$$

where denominators in both the y and z terms are $b^2$.

In three dimensions, we must define three basis vectors for the transformation to the local coordinate system of the ellipse.

$$\vec{d}_i^{(1)} = \frac{\vec{r}_i - \vec{t}}{|\vec{r}_i - \vec{t}|}$$

-continued $$\vec{d}_i^{(2)} = \frac{\begin{bmatrix} 0 & -1 & 0 \\ 1 & 0 & 0 \\ 0 & 0 & 0 \end{bmatrix} \cdot \vec{d}_i^{(1)}}{\left| \begin{bmatrix} 0 & -1 & 0 \\ 1 & 0 & 0 \\ 0 & 0 & 0 \end{bmatrix} \cdot \vec{d}_i^{(1)} \right|}$$

$$\vec{d}_i^{(3)} = \vec{d}_i^{(1)} \times \vec{d}_i^{(2)}$$

$$D_i = [\vec{d}_i^{(1)} \; \vec{d}_i^{(2)} \; \vec{d}_i^{(3)}]$$

We perform the coordinate system change by:

$$\vec{p}'_i = D_i^T(\vec{p} - \vec{o}_i)$$

and compute the fit as:

$$\alpha = \left| (\vec{p}'_i)^T \begin{bmatrix} \frac{1}{a_{ij}^2} & 0 & 0 \\ 0 & \frac{1}{b_{ij}^2} & 0 \\ 0 & 0 & \frac{1}{b_{ij}^2} \end{bmatrix} (\vec{p}'_i) - 1 \right|$$

By arguments similar to the two dimensional case, we choose a threshold as:

$$\eta = \max(s(\Delta_x, \Delta_y, \Delta_z)) =$$

$$\left| \frac{\sqrt{3} |x'|g}{a_{ij}^2} + \frac{3g^2}{4a_{ij}^2} + \frac{\sqrt{3} |y'|g}{b_{ij}^2} + \frac{3g^2}{4b_{ij}^2} + \frac{\sqrt{3} |z'|g}{b_{ij}^2} + \frac{3g^2}{4b_{ij}^2} \right|$$

The algorithm used to identify solution pixels is similar to that of two dimensions, but uses an octtree rather than a quad tree. Under this algorithm, each cubical cell is subdivided into eight smaller cubical cells at each stage of the algorithm.

What is claimed is:

1. A method of locating one or more reflectors in a region of interest, comprising:
    using a transmitter to transmit a radio frequency or acoustic wave to a reflector;
    using a set of receivers to receive a set of reflected signals;
    calculating the path distance of each reflected signal;
    defining an ellipse contour associated with each reflected signal, with the transmitter at one focus and the receiver of that signal at the other;
    representing the region of interest as a first cell;
    representing the cell as a point in the cell;
    calculating the fit of the point to each ellipse contour;
    if the point fits a sufficient number of ellipse contours, dividing the cell into smaller cells, each cell represented by a point in the cell;
    repeating the calculating step for each new cell; and
    determining the location of a reflector from the location of any cell containing a point that fits a sufficient number of ellipse contours.

2. The method of claim 1, wherein the dividing step is performed by dividing the cell into four cells.

3. The method of claim 1, wherein the calculating step is performed by transforming rectilinear coordinates of the region to a new coordinate space consisting of ellipsoids.

4. The method of claim 1, wherein the calculating step is performed by using a scoring function to determine the fit of the selected point to reflector criterion.

5. The method of claim 1, wherein the scoring function is based on the smallest region that contains the smallest circular region containing the cell.

6. The method of claim 1, wherein the sufficient number of ellipses is the same as the number of receivers.

7. The method of claim 1, wherein the cells are square and each cell is represented by a point in the center of that cell.

8. The method of claim 1, wherein the method is performed in two dimensions, such that the cells and ellipses are two dimensional.

9. The method of claim 1, wherein the method is performed in three dimensions, such that the cells and ellipses are three dimensional.

* * * * *